Patented Sept. 20, 1927.

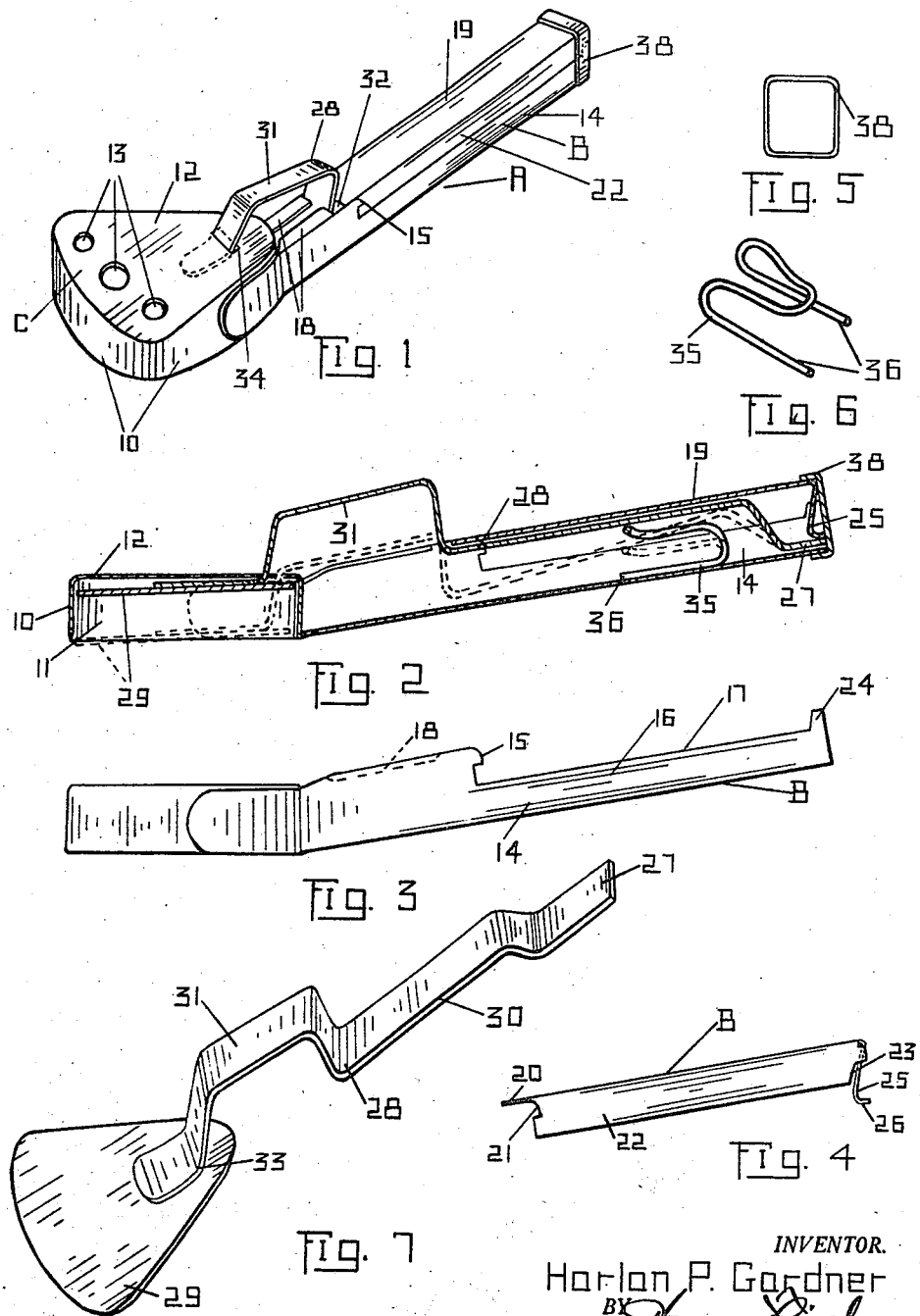

1,642,726

UNITED STATES PATENT OFFICE.

HARLAN P. GARDNER, OF ST. PAUL, MINNESOTA, ASSIGNOR TO LUCILE GARDNER, OF ST. PAUL, MINNESOTA.

ICE-CREAM SCOOP.

Application filed March 20, 1925. Serial No. 16,955.

My invention relates to scoops and is particularly adapted to be used with ice cream or like material where it is desired to dish out in a convenient shape the ice cream to the customer.

A feature of the invention resides in a scoop which will dish out a slice of ice cream which is of the shape of a piece of pie so that it can be used particularly for a pie-a-la-mode scoop or it can be used to dish up the ice cream into a dish which is the shape of a piece of pie. To this end the receiving portion of the scoop is made substantially sector shaped, excepting that it is provided with round corners so as to make a more attractive and finished article and to permit it to be easily operated.

A feature of the invention resides in a scoop which can be all taken apart and so that the parts can be substituted by other similar parts should it be desired to replace any of them. This feature is very important in the invention as it permits the scoop to be easily manufactured from dies and tools, thus making all of the parts practically identical.

The invention also includes an adjustable spring means for drawing the ejecting plate into receded position within the scoop. It is also a feature of the invention to provide the ejecting plate of a simple construction, the supporting portion of which extends into the handle and forms a means for engagement projecting out of the handle and scoop, so that it can be depressed to force the plate out of the scoop and eject the contents thereof.

Other features and peculiar formation of the parts will be more clearly set forth in the specification and claims.

In the drawings forming part of the specification,

Figure 1 is a perspective view of my scoop.

Figure 2 is a central longitudinal cross section of the same.

Figure 3 illustrates one of the portions of the scoop when it is taken apart.

Figure 4 illustrates another portion of the scoop taken apart.

Figure 5 illustrates the handle cap and means for locking the parts together.

Figure 6 illustrates the spring for the scoop.

Figure 7 illustrates a perspective view of the ejecting plate and the supporting member which is provided with the offset portion to permit the operation of the plate.

The scoop A is of a simple construction, having a handle portion B of a square cross sectional shape and upon the forward end of which is secured the scoop member C.

The scoop member C is of a sector shape as illustrated in the drawings and is provided with downwardly depending side walls 10 on the three sides of the same, which form the chamber 11 of the scoop, together with the back portion 12. The back portion 12 is provided with openings 13 to permit the cleansing and to relieve the material of any kind which may lodge in back of the ejecting plate in the scoop chamber, which will be hereinafter described. The sides 10 of the scoop C extend and connect together to form round corners as illustrated in the drawing, which permits the easy cleansing of the scoop and provides a more desirable shape to the same.

The handle B of the scoop A is formed of two main parts, the lower portion 14 of which is channel shaped and is provided with shoulders 15 on the side walls 16 of the handle portion 14. A cut away portion 17 is provided in the side walls 16 of the handle portion 14 and inwardly projecting flange members 18 are formed extending inwardly toward each other just ahead of the shoulders 15 to form a top portion to the forward end of the handle portion 14.

The upper portion 19 of the handle B is also channel shaped and is provided with a tongue 20 on the forward end thereof which extends between the side walls 16 just ahead of the shoulders 15. A recess 21 is formed in the forward edge of the side walls 22 of the handle portion 19 which conforms in shape with the shoulders 15 and is adapted to fit and interlock with the same when the handle portion 19 is fitted together with the handle portion 14, as illustrated in Figure 1 in the drawings.

The rear edges of the walls 22 of the portion 19 are cut away at 23 to form an engaging notch which is engaged by the lugs 24 formed on the rear end of the handle portion 14, thus causing the parts to fit closely together. The rear end of the handle portion 19 is provided with a downwardly depending tongue 25 which is a continuation of the top of the portion 19 and which is of practically the same width as the top so as to fit between the side walls 16 of the rear end of the handle portion 14. The stop tongue 25 has its lower end curved to form a shoulder 26 which engages against the free end 27 of the arm 28, which supports the ejecting plate 29. The rear end of the arm 28 is bent downward at the free end 27, so that this end lies along the bottom of the channel of the handle portion 14, while the portion 30 of the arm 28 normally extends along the inside and engages against the portion 19 of the handle B, as illustrated in Figure 2.

A thumb engaging portion 31 is formed on the arm 28 which projects upwardly from the portion 30 and extends through the opening 32 formed between the tongue 20 and the rear edges of the flanges 18, as illustrated in Figure 1. The arm 28 slides freely in this opening 32 so as to permit the plate 29 to be operated up and down in the chamber 11 of the scoop C.

The plate 29 is of sector shape, having the round corners so as to fit closely within said walls 10 of the scoop C. The arm 28 is secured in a suitable manner to the back of the plate and projects downwardly from the portion 31 to the point of engagement 33 on the plate 29. An opening 34 is formed in the back 12 of the scoop C to permit the arm 28 to pass through the same.

The arm 28 and plate 29 are held in upward position with the plate receded into the chamber 11 of the scoop C, as illustrated in Figure 2, normally, by the wire spring 35 which is illustrated in Figure 6 and which is of sufficient resiliency and rigidity to provide the means for returning the plate 29 to inner position within the scoop C. The spring 35 is held freely beneath the portion 30 with its free ends 36 frictionally engaging in the channel portion 14 between the side walls 16, but free to be slid into a position either close to the free end 27 of the arm 28 or moved forward toward the engaging portion 31. When the spring is moved closer toward the front of the handle or toward the portion 31 it provides a stronger operating means to return the plate 29 and arm 28 to normal position. In this manner the spring 35 can be adjusted to the desired tension which will operate the plate most effectively in use.

In Figures 3, 4, 5, 6 and 7 I have illustrated the parts of my scoop separate from each other and in assembling them the plate 29 and arm 28 are connected to the scoop C by passing the free end 27 of the arm 28 through the opening 34. The spring 35 is then positioned within the portion 14 of the handle B and then the portion 19 is placed into engagement with the shoulders 15 and closed down against the flanges 24, while the locking cap 38 is slipped over the end of the members 14 and 19 to form the end of the handle B. This cap 38 forms a closure for the end of the handle and frictionally engages the members 14 and 19 of the handle so as to hold them closely and firmly together. The scoop is then ready for operation.

In operating the scoop the scoop portion C is placed into the ice cream and is moved to scrape the chamber 11 full of ice cream or other material which it is desired to be scooped out of a receptacle. When the chamber 11 is filled with ice cream the scoop is withdrawn from the bulk receptacle and by pressing on the thumb operating portion 31 of the arm 28 the ejecting plate 29 is moved into the downward position illustrated in Figure 2, thus ejecting the contents of the scoop C therefrom. This operation is very simple and is repeated rapidly without any difficulty, even by those having little or no experience in the use of the scoop before.

The parts of my scoop A are made by dies and fit perfectly together. The ejecting plate 29 is smooth and operates freely within the chamber 11 so as to freely and readily eject the ice cream from the chamber into a cone particularly designed for use with my scoop, to provide an ice cream pie of a very desirable nature. The cone is not illustrated in this application, but it is obvious that the operation of the scoop is simple and effective, so that an ice cream cone of the shape of a piece of pie is offered to the customer which holds the ice cream firmly within the cone so that it is spread out in a flat sector shape rather than of a semicircular shape as has been done heretofore in other cones. In this manner I provide a scoop of a very desirable nature which is adapted to readily dish out ice cream into a sector shaped container to make a very desirable and attractive ice cream confection.

In accordance with the patent statutes I have described the principles of operation of my scoop and while I have illustrated particular formation and construction in the drawings, I desire to have it understood that they are only illustrative and that the invention can be carried out by other means and applied to uses other than those above set forth within the scope of the following claims.

I claim:

1. An ice cream scoop including a sector shaped scoop compartment, an ejecting plate within said compartment, a separable handle member of a rectangular cross section with channel shaped upper and lower portions, an arm for operating said ejecting plate, having its free end projecting into said handle, resilient means for holding said arm in a set position and a cap for closing the end of said handle and locking the separable parts together.

2. A separable ice cream scoop including a handle having channel shaped portions adapted to nest together, an ejecting plate within the body of said plate and a locking cap for the end of said handle to hold said separable parts together.

3. A separable ice cream scoop including a scoop portion having a handle portion projecting therefrom of a substantially channel shape, a cover for said handle adapted to form the top thereof and a locking cap adapted to engage over the end to form a closure therefor and lock the parts of said scoop together.

4. A separable ice cream scoop including a scoop head, a separable handle projecting from said scoop head and secured thereto, an ejecting plate positioned within said scoop head, an arm for operating said plate, means for holding the free end of said arm within said handle, adjustable spring means within said handle for operating said arm in one direction and a closure cap adapted to lock the parts of the handle of said scoop together in a manner to hold the plate, arm and handle together in operative position.

5. An ice cream scoop including a separable handle and ejecting plate and a closure cap for the end of said handle adapted to lock the parts together in a manner to hold them in operative position.

6. An ice cream scoop including a sector shaped scoop portion, a separable handle secured to said scoop portion, including upper and lower channel shaped members, means for locking said members together on one end, a cap for closing the other end and adapted to lock the handle members together and an ejecting plate having a supporting arm extending through the back of said scoop portion and down into the handle portion of said scoop.

HARLAN P. GARDNER.